United States Patent
Olanders et al.

(10) Patent No.: US 10,763,982 B2
(45) Date of Patent: Sep. 1, 2020

(54) METHOD AND SYSTEM FOR OVER-THE-AIR TESTING OF UNWANTED EMISSIONS

(71) Applicant: Telefonaktiebolaget LM Ericsson (publ), Stockholm (SE)

(72) Inventors: Peter Olanders, Stockholm (SE); Elena Pucci, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 12 days.

(21) Appl. No.: 16/076,758

(22) PCT Filed: Feb. 23, 2016

(86) PCT No.: PCT/EP2016/053733
§ 371 (c)(1),
(2) Date: Aug. 9, 2018

(87) PCT Pub. No.: WO2017/144079
PCT Pub. Date: Aug. 31, 2017

(65) Prior Publication Data
US 2019/0052383 A1    Feb. 14, 2019

(51) Int. Cl.
*H04B 17/354* (2015.01)
*H04B 17/29* (2015.01)
*H04B 17/16* (2015.01)

(52) U.S. Cl.
CPC ........... *H04B 17/354* (2015.01); *H04B 17/16* (2015.01); *H04B 17/29* (2015.01)

(58) Field of Classification Search
CPC ....... H04B 17/16; H04B 17/29; H04B 17/354
See application file for complete search history.

(56) References Cited

U.S. PATENT DOCUMENTS 6,687,238 B1 * 2/2004 Soong ................ H04W 52/246
370/335
2008/0267086 A1   10/2008 Wheatley et al.
(Continued)

FOREIGN PATENT DOCUMENTS

WO    2014040608 A1    3/2014

OTHER PUBLICATIONS

Sivasamy, R. et al., "A Novel Shield for GSM 1800 MHz Band Using Frequency Selective Surface", Progress in Electromagnetics Research Letters, vol. 38, Feb. 22, 2013, pp. 193-199, College of Engineering, Anna University, Chennai, India.
(Continued)

*Primary Examiner* — Huy D Vu
*Assistant Examiner* — Nizam U Ahmed
(74) *Attorney, Agent, or Firm* — Coats + Bennett, PLLC

(57) ABSTRACT

A method (200) of over-the-air testing of a transmission equipment (20). The method comprises transmitting (202) a transmission signal from the transmission equipment. The transmission signal as transmitted comprises emissions in an in-band domain (102) and emissions in an unwanted domain (110). The method comprises arranging a frequency selective surface (40) to receive the transmission signal. The frequency selective surface (40) attenuates the transmission signal in the in-band domain (102) of the transmission signal. The frequency selective surface (40) allows propagation of the transmission signal in the unwanted domain (110) of the transmission signal. The method further comprises measuring (206) in a measuring equipment (25) a parameter of the transmission signal in the unwanted domain. The frequency selective surface (40) is arranged between the transmission equipment (20) and the measuring equipment (25).

14 Claims, 3 Drawing Sheets

Example Emissions Spectrum

(56) References Cited

U.S. PATENT DOCUMENTS

2014/0209374 A1*  7/2014  Song .................... H01L 23/552
                                                     174/388
2015/0017928 A1*  1/2015  Griesing ............ H04B 17/0087
                                                     455/67.14

OTHER PUBLICATIONS

Barton, J. et al., "All-Dielectric Frequency Selective Surface for High Power Microwaves", IEEE Transactions on Antennas and Propagation, vol. 62, No. 7, Jul. 1, 2011, pp. 3652-3656, IEEE.
Radiocommunication Sector of ITU, "Unwanted emissions in the spurious domain", Recommendation ITU-R SM.329-12, Sep. 1, 2012.

\* cited by examiner

Example Emissions Spectrum

Example Emissions Spectrum and Filtering Spectrum

METHOD AND SYSTEM FOR OVER-THE-AIR TESTING OF UNWANTED EMISSIONS

TECHNICAL FIELD

Aspects of the invention relate to a method of over-the-air testing and a test system for over-the-air testing.

BACKGROUND

Unwanted emissions may be considered as electromagnetic disturbances which can cause interference with other signals from e.g. wireless communication services. Nowadays, the frequency allocation of most wireless communications is strictly assigned and shared, and high frequency wireless systems are becoming more popular. The manufacturer of equipment which radiates electromagnetic signals is often mainly responsible for any caused interference. Therefore, it is important to define the level of out-of-band and spurious emissions generated by a radio equipment. For example, the emissions may be coming from an antenna and radio equipment in a base station of a wireless communications network. The measurement of the level of out-of-band and spurious emissions may be used for type approval or on production lines in order to satisfy an electromagnetic interference (EMI) compliance tests and regulatory requirements. Meeting such requirements minimizes interference on other equipment.

FIG. 1 shows an example emissions spectrum 100, which comprises both wanted emissions 102 (in-band) and unwanted emissions 110. The in-band frequency range is used for communication of data, and may be referred to as an operation bandwidth. The unwanted emissions 110 may be considered as comprising spurious emissions 112 and out-of-band emissions 114. The in-band emissions are within an operation bandwidth. The operation bandwidth may be used for radio access communication, e.g. between a base station and a wireless terminal. In this example, the unwanted emissions 110 comprising spurious emissions 112 and out-of-band emissions 114 occur at frequencies above and below the in-band emissions 102.

Spurious emissions 112 may be defined as emissions which are outside the operation bandwidth. In some examples, their level might not directly affect the transmission of information in the operations bandwidth. The spurious emissions may comprise contributions from:
  Harmonic emissions: Emissions at frequencies which are multiples of the center frequency emissions
  Parasitic emissions: Emissions accidentally generated at frequencies which are independent of the carrier or frequency of an emission.
  Intermodulation products: Spurious intermodulation products resulting from the oscillations at the frequency of an emission.
Out-of-band emissions 114 are in a range adjacent in frequency, e.g. immediately outside, the bandwidth of operation.

Conventionally, in-band emissions are measured at an Antenna Reference Point (ARP) using a cable connected to measurements instruments, a so-called conductive measurement. Measurements outside in-band are performed with a passive load connected to the ARP, i.e. all in-band energy is absorbed in the passive load. A desire for higher data rates and for higher capacity has led to the advance of high integrated antenna systems, for example Active Antenna System (AAS), which may have beam-forming capability. A further example may be a Massive MIMO (Multiple-Input-Multiple-Output) antenna, in which the antenna is integrated within the radio unit in one single module without connectors.

Such antenna types may not provide physical access to an antenna output port, or the number of ARP connectors is too large (e.g. in very large array antennas with hundreds of elements). This may make access difficult to the antenna to perform conductive measurements.

In order to measure the system performance, an Over The Air (OTA) test configuration may be used. An OTA test may also be used for measuring the unwanted emissions radiated by the whole system when the transmitter is on.

Measurements of radiated unwanted emissions are done in an indoor controllable environment, for example in an anechoic chamber or reverberation chamber. An issue of an OTA test results from the high radio frequency (RF) output power (in-band signal) radiated inside the chamber by the Device Under Test (DUT). The power of the in-band signal may cause Passive Intermodulation (PIM) within the test range, thus creating non-representative signals. The in-band signal may interfere with the radiated unwanted emissions in the out-of-band/spurious region, leading to unreliable results. In some cases, the in-band signal may block, or even destroy, the sensitive measuring equipment in the test chamber.

An improved measurement method and system is desired for measurement of unwanted emissions in an OTA test.

SUMMARY

A first aspect of the present invention provides a method of over-the-air testing of a transmission equipment. The method comprises transmitting a transmission signal from the transmission equipment. The transmission signal as transmitted comprises emissions in an in-band domain and emissions in an unwanted domain. The method comprises arranging a frequency selective surface to receive the transmission signal. The frequency selective surface attenuates the transmission signal in the in-band domain of the transmission signal. The frequency selective surface allows propagation of the transmission signal in the unwanted domain of the transmission signal. The method further comprises measuring in a measuring equipment a parameter of the transmission signal in the unwanted domain. The frequency selective surface is arranged between the transmission equipment and the measuring equipment.

Thus, measurements of unwanted emissions from the transmission equipment are improved.

A second aspect of the present invention provides a test system configured to test a transmission equipment to be tested in an over-the-air test. The transmission equipment is configured to transmit a transmission signal, and the transmission signal as transmitted comprises emissions in an in-band domain and emissions in an unwanted domain. The test system comprises a frequency selective surface to receive the transmission signal. The frequency selective surface attenuates the transmission signal in the in-band domain of the transmission signal. The frequency selective surface allows propagation of the transmission signal in the unwanted domain of the transmission signal. The test system further comprises a measuring equipment configured to measure a parameter of the transmission signal in the unwanted domain. The frequency selective surface is arranged between the transmission equipment and the measuring equipment.

BRIEF DESCRIPTION OF THE DRAWINGS

Embodiments of the present invention will now be described, by way of example only, with reference to the accompanying drawings in which.

DETAILED DESCRIPTION

Examples of the present disclosure provide for measurement of unwanted emissions in an OTA test. The emissions from a DUT is filtered by a stop-band filter, which is configured to stop or attenuate the signal in the in-band frequency range. The unwanted emissions, e.g., the out-of-band signal, are allowed to propagate without significant attenuation. The stop-band filter is a frequency selective surface (FSS). The construction and properties of a FSS are described below. The use of the FSS allows isolating the high power radiated by the system in the operations bandwidth from measuring equipment, in order to better perform an OTA test on unwanted emissions.

Figure 2:
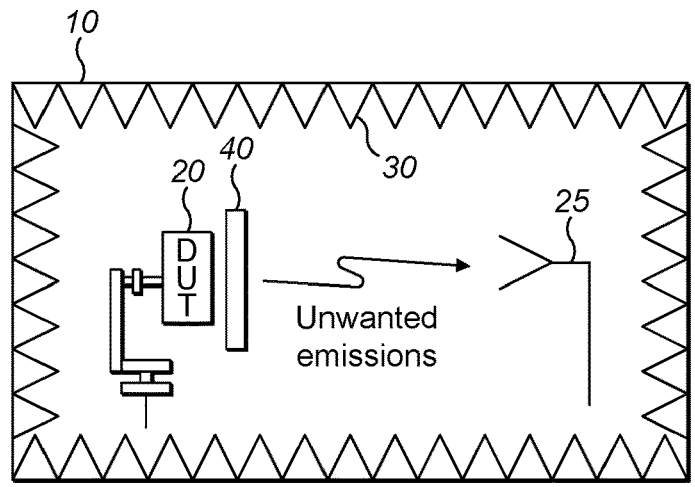
FIG. 2 shows an example of a test system according to an example of the disclosure.

FIG. 2 shows an example of a test system 10 configured for an OTA test. The test system may also be known as a test range or a test arrangement. The test system 10 may be considered as comprising a DUT 20, also termed transmission equipment, for example an antenna. In some examples, the DUT 20 comprises radio equipment attached to the antenna, for generating the RF signal to be radiated. The DUT may be considered as one or more devices or equipment which is being tested. The DUT may alternatively be referred to as Equipment Under Test (EUT) may be used as an alternative. The DUT may be referred to as equipment, e.g. comprising one or more of an antenna, antenna system and/or radio equipment.

The equipment under test, e.g. an antenna and/or radio equipment, may be for use in a radio access network. For example, the antenna and/or radio equipment may be intended for use in a base station. Alternatively, the antenna may be intended for use in a wireless terminal for communicating in a radio access network. In some examples, the antenna is for use in a wireless local access network, e.g. by an access point or wireless devices. The antenna may be for use with any radio access technology or wireless communication type or protocol. The equipment under test may operate according to any radio access technology, for example, a radio access technology standardized by the 3rd-Generation Partnership Project (3GPP), including: a 5G Technology (e.g. LTE Evolution, LTE-NX), Long-Term Evolution (LTE), Universal Mobile Telecommunications System (UMTS)/Wideband Code-Division Multiple Access (WCDMA), High Speed Packet Access (HSPA) and Global System for Mobile Communications (GSM). In some examples, the equipment may be a part of an Evolved Universal Terrestrial Radio Access Network (E-UTRAN). The equipment may be for a non-3GPP radio access technology, such as a WLAN (e.g. Wi-Fi) or WiMAX. WLAN technology is described in IEEE 802.11 standards. WiMAX is described in IEEE 802.16. In some examples, the equipment may be intended to operate in an unlicensed band, e.g. LTE-U.

In some examples, the DUT is an active antenna system. The OTA tests by the test system 10 are of radiated unwanted emissions. OTA tests are used when the ARP is not available, e.g. in an integrated solution, or the system performance needs to be captured by radiated requirements rather than conductive requirements. The examples described are applicable also to a DUT (i.e. antenna) even if the ARP connectors are present at the interface between the antenna and the RF unit, but they are difficult to access and/or radiated requirements are requested by a compliance test or a regulator.

Figure 1:
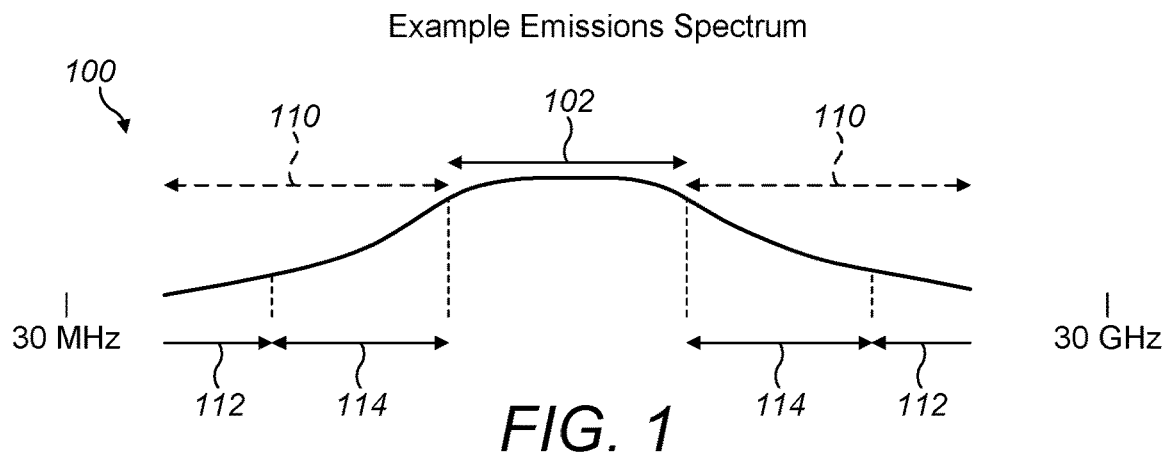
FIG. 1 shows a graph showing an example emissions spectrum from an equipment.

For the purposes of explanation, the spectrum of radiation emitted by the DUT 20 is that shown in FIG. 1. The unwanted emissions 110 are shown as typically occurring both above and below the frequency range of the operation bandwidth.

The test system 10 further comprises a measuring equipment 25. The measuring equipment 25 is configured to measure one or more parameters of the DUT 20. In some examples, the measuring equipment comprises a receiving antenna. For example, the measuring equipment 25 is configured to measure a parameter of received power. In some examples, the measuring equipment is configured to determine a field strength or power flux density (PFD) or a power values, for example as Equivalent Isotropically Radiated Power (E.I.R.P.), or Effective Radiated Power E.R.P.). A determined field strength may be in terms of an electric field and/or a magnetic field.

For examples, the electric field strength unit may be expressed in V/m, μV/m or dB(μV/m). The magnetic field strength unit may be expressed in Nm, μA/m or dB(μA/m). The PFD may be expressed in $W/m^2$, $dB(W/m^2)$ or $mW/cm^2$.

The measuring equipment 25 may be configured to measure the one or more parameter only corresponding to unwanted emissions. The measured parameter may correspond to only out-of-band frequencies, i.e. in an out-of-band domain. Alternatively, the measured parameter may be for all unwanted emissions, or only for spurious emissions. For the purposes of the test, the measuring equipment 25 will not measure, or measurements made are not used, in an in-band frequency range.

In some examples, the measuring equipment comprises a selective measuring receiver, e.g. a selective receiver or a spectrum analyser may be used for the measurement of the parameter.

In this example, the DUT 20 and measuring equipment 25 are located inside a chamber 30. The chamber may be an anechoic or reverberation chamber. The DUT 20 and measuring equipment 25 are separated by an air space, such that the emissions from the DUT 20 are received over-the-air. Alternatively, any suitable chamber or area may be used for the OTA test. The chamber 30 may be considered as a test range.

The test system 10 further comprises a frequency selective surface (FSS) 40. The FSS 40 may be considered as a filtering part of a filter element. The FSS 40 provides a stop-band filter. The FSS is placed in front or around the DUT. The FSS 40 is shaped and/or positioned between the DUT 20 and measuring equipment 25. The FSS 40 and/or test system is shaped and/or positioned such that all radiation emitted from the DUT 20 propagates through the FSS 40 prior to reaching the measuring equipment 25. For example, the FSS may fully or partially surround the DUT 20. The FSS 40 is arranged to operate as a special absorber, attenuating the high power coming from the in-band (wanted) signal within its operational bandwidth. The measuring equipment may comprise an antenna configured to receive the filtered transmitted signal and/or analysis equipment (not shown) configured to determine the parameter for the part of the unwanted domain which is the subject of the test. Thus, all emissions from the DUT 20 are filtered by the FSS 40 before reaching any part of the measuring equipment.

In further examples, the test system 10 may be considered as not comprising the DUT 20. For example, the test system 10 may be considered as comprising the measuring equipment 25, the FSS 40. In some examples, the test system 10 may be considered as optionally including the chamber 30.

The FSS 40 is arranged to be transparent (or have a known attenuation) to the signals emitted outside the operational bandwidth, i.e., unwanted emissions. The FSS 40 is arranged to pass the transmission at frequencies outside of the in-band signal, i.e. unwanted (spurious and/or out-of-band signals). In some examples, references to the FSS 40 being arranged to pass or being transparent may include substantially passing or substantially transparent. The FSS 40 is used for the particular use of attenuating in-band signals in order to measure radiated unwanted emissions in OTA tests of wireless equipment. For example, the FSS 40 is used in combination with an AAS, e.g. a high power integrated antenna systems with no/difficult access to ARP.

The FSS 40 is not part of the measuring equipment 25. The FSS is separate to the measuring equipment 25 and DUT 20. The emissions from the DUT 20 propagate in air after passing through the FSS 40. As such, the FSS 40 is not a filter within a receiver of the measuring equipment.

The FSS 40 may be configured to dissipate heat coming from the attenuated signal. The level of attenuation provided by the FSS 40 is as requested by the specific application, e.g. to provide a standard test. In some examples, the FSS 40 is arranged to operate for different angles of incidence and/or for different polarizations. For example, this may be needed for testing of a beamforming antenna. The FSS 40 is designed to operate at the correct stop-band region, e.g. the stop-band region of the FSS 40 coincides or is within an in-band frequency range of the DUT 20.

Figure 3:
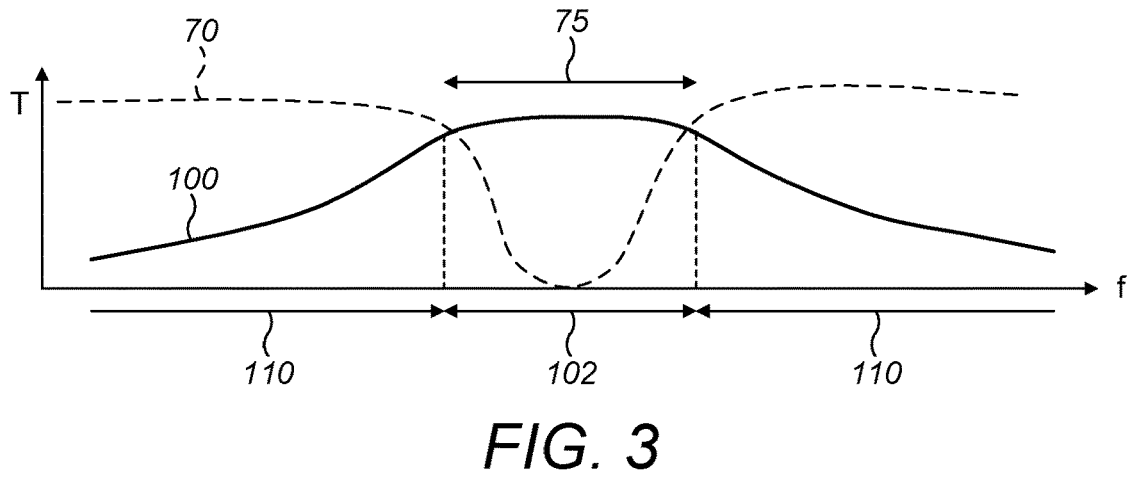
FIG. 3 shows a graph showing the example emissions spectrum from the equipment and filtering spectrum of the frequency selective surface according to an example of the disclosure.

FIG. 3 shows an example of the of the FSS filter spectrum 70. Also shown for comparison is the radiation spectrum 100 shown in FIG. 1. As described above, the FSS 40 provides a stop-band 75, in which an incident signal is highly attenuated or stopped. The FSS filter spectrum 45 and emissions spectrum 100 show a parameter of signal as transmitted or allowed to propagate through, as a transmittance T, over a frequency range f. For frequencies outside of the stop-band 75, the FSS 40 provides for a small or no attenuation.

The stop-band 75 is arranged to coincide with the in-band signal 102 of the DUT 20. For example, a minimum frequency of the in-band signal coincides with a minimum frequency of the stop-band. A maximum frequency of the in-band signal coincides with a maximum frequency of the stop-band.

In some examples, the FSS attenuates the in-band signal 102 to several dBs down. The unwanted domain emissions 102, i.e. outside of the in-band signal, propagate through the FSS 40. The propagation through the FSS of the unwanted domain emissions 102 is with an attenuation which is substantially lower than in the stop-band, e.g. substantially zero or a low attenuation. In some examples, the attenuation of the unwanted emissions (e.g. in the out-of-band domain) is measured, as part of a calibration of the measurement set-up. The attenuation due to the FSS 40 of the unwanted emissions can then be compensated for in determining the unwanted emissions which are generated by the DUT 20.

The FSS 40 functions to selectively filter the transmission signal. An in-band signal, also referred to as an in-band domain, are attenuated or stopped by the FSS. Unwanted emissions, also referred to as emitted in an unwanted emissions domain, are allowed to pass with a low (and in some examples a known) attenuation. The attenuation of the unwanted emissions may be considered as a low proportion of the unwanted emission power and/or low compared to the attenuation of the in-band signal. The unwanted emissions comprise spurious emissions, also referred to as emissions in a spurious domain, and out-of-band emissions, also referred to as emissions in an out-of-band domain. A domain may be considered as a frequency range. In some aspects, the domain is a radio frequency (RF) domain.

The level of attenuation, bandwidth and roll-off of the FSS filter may be designed according to the AAS specifications and unwanted emissions requirement.

In an alternative example, the measurement method and apparatus describes is configured to block the unwanted emissions (i.e. out-of-band and spurious domain signals), and measure the in-band signal. However, the main example described addresses the high power levels in the measurement chamber caused by in-band radiation, and the blocking of those high power level in-band signals with the FSS.

The disclosure provides for measurement of unwanted emissions in over-the-air tests, of a DUT, e.g. active antenna systems, with no/difficult access to an antenna reference connector. The testing is carried out by using a filter formed with a frequency selective surface with stop-band characteristics.

Example constructions of suitable Frequency Selective Surfaces will now be described. The FSS 40 is a periodic structure which exhibits filter characteristics. The FSS is designed to perform as a stop-band filter. Different designs of FSS may perform as high-pass or band-pass filters, which may be used in further examples of the method and apparatus described.

Figure 4A:
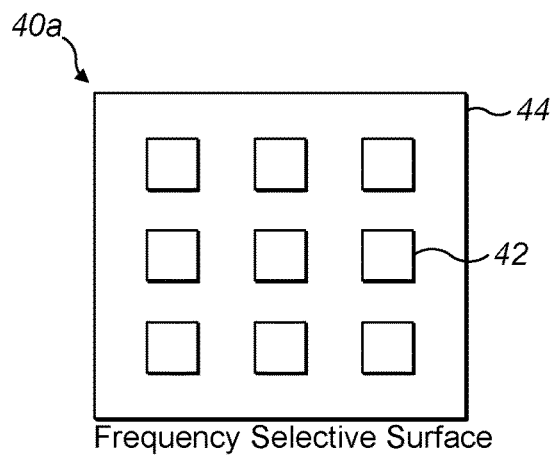
FIG. 4a shows an example construction of the frequency selective surface according to an example of the disclosure.

FIG. 4a shows an example construction 40a of the FSS 40. The FSS 40a comprises conducting patches 42 (e.g. metal plates) arranged in a pattern. This type of FSS is considered a capacitive FSS. The pattern may be considered as an array or a periodic grid. The metal plates are thus arranged in a two-dimensional periodic grid. The plates are located on a dielectric substrate or slab 44. In some examples, the conducting patches 42 are attached to the dielectric substrate 44. In further examples, the conducting patches 42 are embedded in the dielectric substrate 44.

The plates in this example have a square shape. In further examples, the pattern and/or plate may be a different shape, in order to obtain the required frequency filtering response.

Figure 4B:
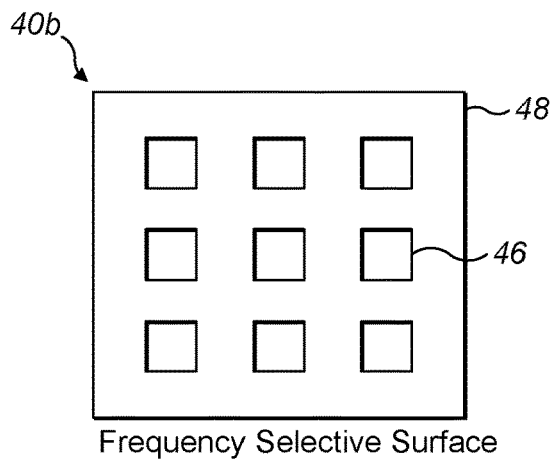
FIG. 4b shows an example of an alternative construction of a frequency selective surface.

FIG. 4b shows a further example of a construction of a FSS 40b. This example is a dielectric aperture type of FSS. The FSS 40b comprises apertures 46 arranged in a pattern. This type of FSS 40b is considered an inductive FSS. The pattern may be considered as an array or a periodic grid. The apertures 46 are thus arranged in a two-dimensional periodic grid. The apertures are formed in a dielectric substrate or slab 48. The apertures in this example have a square shape.

Any FSS design can be used if it provides the filter characteristics needed to measure the out-of-band emissions.

In further examples of any construction of FSS 40a,40b, the pattern of plates 42 or apertures 46 may be a different shape, in order to obtain the required frequency filtering response. For example, the shapes may be a square, hexagon, tripole, circular, or other shape. In some examples, the FSS 40 comprises one or more layers. The number of layers may be determined FSS based on the filter response requirement of the FSS. The filter properties of the FSS depends on the number of layers.

For the examples of FIGS. 4a and 4b, the frequency response of the FSS is determined by the geometry and design of the surface. For example, the frequency response of the filter depends on the FSS size, shape, orientation, material, and number of surfaces stacked together. The pattern of metal plates or apertures repeats in the pattern over the whole area of the FSS.

Figure 4C:
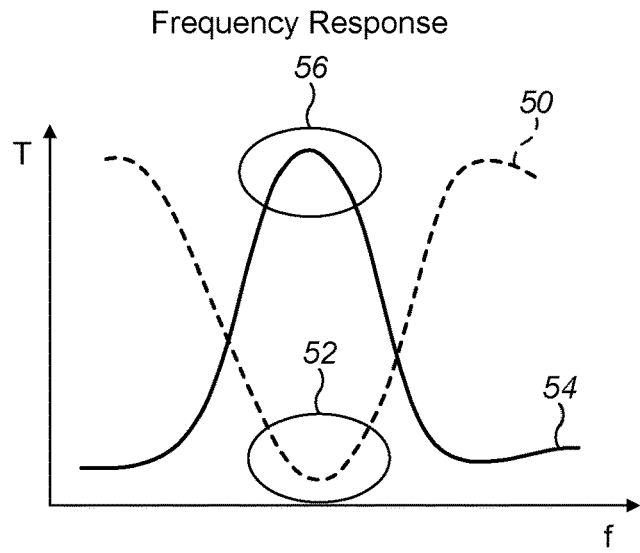
FIG. 4c shows examples of a frequency response of the constructions shown in FIGS. 4a and 4b.
Figure 5:
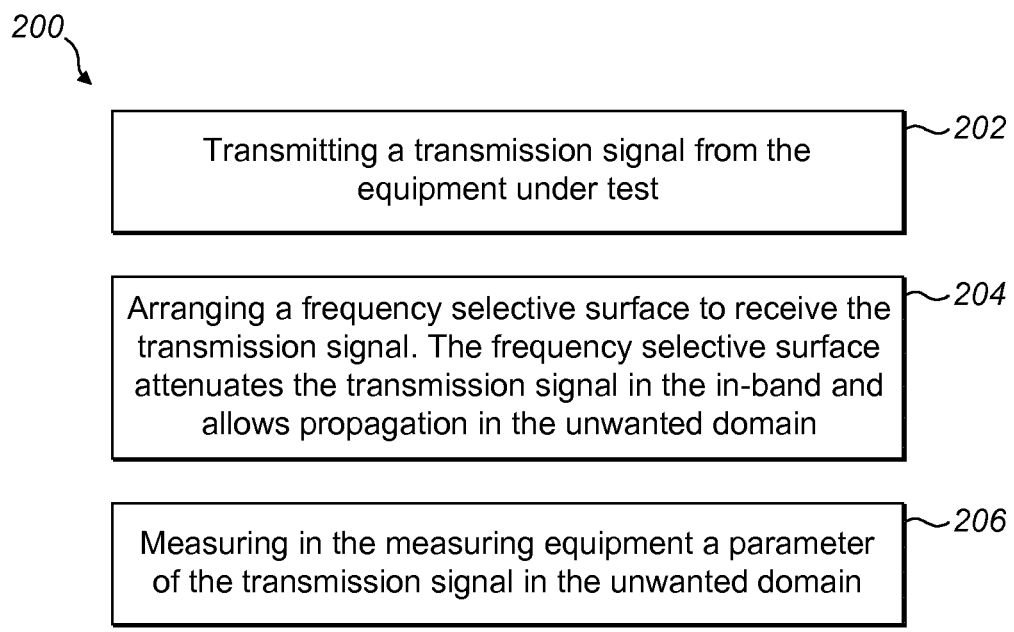
FIG. 5 shows an example method according to an example of the disclosure.

FIG. 4c shows a frequency response of the conducting plate (capacitive) FSS 40a and aperture type (inductive) FSS 40b. A transmittance T is shown against frequency f for each type.

The conductive (e.g. metal) plate type of FSS is shown acting as a band-stop type of filter 50, i.e. stopping (or highly attenuating) frequencies in a particular stop band or range 52. The stop band 52 is determined by the characteristics of the FSS 40a, e.g. conducting plate size and shape. Radiation having frequencies above or below the stop band 52 are allowed to propagate with low or no attenuation.

The aperture type of FSS 40b is shown acting as a band-pass filter 54, i.e. having a passband 56 at a particular frequency. Examples may use any type of FSS filter to provide for attenuation of the in-band signal, and allow measurement of the unwanted emissions.

FIG. 6 shows a method 200 of over-the-air testing of an equipment according to an example of the disclosure. These points may be carried out in any suitable order, or simultaneously, to carry out the testing.

In 202, the method comprises transmitting a transmission signal from the equipment under test. The transmission signal as transmitted comprises emissions in an in-band domain and emissions in an unwanted domain In 204, a frequency selective surface is arranged to receive the transmission signal. The frequency selective surface is arranged between the transmission equipment and the measuring equipment 25. The frequency selective surface is configured to attenuate the transmission signal in the in-band domain of the transmission signal, and the frequency selective surface is configured to allow propagation of the transmission signal in the unwanted domain of the transmission signal. In some examples, if only a part of the unwanted domain is being measured (e.g. spurious domain or out-of-band domain), the FSS 40 may allow propagation in the part of the unwanted domain being measured. The FSS may allow propagation of the unwanted emissions with a small or low attenuation, that is, smaller than the attenuation of the in-band signal and/or reducing by only a small proportion the power of the unwanted emissions. Any attenuation in a measured part of the spectrum may be characterized and compensated for. A separate part of the unwanted domain, which is not being measured, may or may not be attenuated by the FSS 40.

In 206, the method comprises measuring in the measuring equipment a parameter of the transmission signal in the unwanted domain. As such, a measurement is made of the transmission signal as filtered by the FSS 40.

The solution provides a filter which utilizes the special properties of the frequency selective surfaces, which can absorb/dissipate the high power radiated by the DUT (e.g. AAS). At the same time, the FSS is substantially transparent to the unwanted signals (e.g. in the out-of-band and spurious regions) which are the subject of measurement. Thus, the attenuation by the FSS of the signals which the DUT is intended to generate (i.e. in-band signals) allows improved measurement of the unwanted signals. The use of a FSS is in an over-the-air test to attenuate high-power in-band signals, allowing more accurate measurement of out-of-band and spurious signals which are not substantially attenuated by the FSS.

An advantage of the FSS is it functions as a special absorber, or a spatial filter, which can be mounted around the antenna. The FSS does not need to be connected directly to the antenna or at the receiver, thus making the measurement setup simple.

The use of the FSS in the over-the-air test system is considered to be cost effective. The test system is considered easy to setup, and the FSS is independent of the test range and test equipment used. The FSS can be easily placed around the DUT. The FSS is scalable, i.e. a suitable FSS can be designed for any frequency range. The test system including the FSS may be considered as flexible. The FSS can be designed to give the required filter response, depending on, e.g., the requirements of attenuation, bandwidth, insertion loss and angle of incident needed.

The invention claimed is:

1. A method of over-the-air testing of a transmission equipment, the method comprising:
   transmitting a transmission signal from the transmission equipment, wherein the transmission signal as transmitted comprises emissions in an in-band domain and emissions in an unwanted domain;
   arranging a frequency selective surface to receive the transmission signal, wherein the frequency selective surface attenuates the transmission signal in the in-band domain of the transmission signal, and wherein the frequency selective surface allows propagation of the transmission signal in the unwanted domain of the transmission signal; and
   measuring, in a measuring equipment, a parameter of the transmission signal in the unwanted domain;
   wherein the frequency selective surface is arranged between the transmission equipment and the measuring equipment.

2. The method of claim 1, wherein the frequency selective surface functions as a stop-band filter which attenuates the transmission signal substantially only in the in-band domain.

3. The method of claim 1, wherein the frequency selective surface is a capacitive type of frequency selective surface.

4. The method of claim 3, wherein the frequency selective surface comprises an array of conductive elements arranged on a dielectric.

5. The method of claim 1, wherein the transmission equipment comprises an antenna system, an Active Antenna System, a multi-antenna, or a Multiple-Input-Multiple-Output (MIMO) antenna.

6. The method of claim 1, wherein the measuring the parameter of the transmission signal in the unwanted domain comprises measuring the transmission signal in a spurious domain.

7. The method of claim 1, wherein the measuring the parameter of the transmission signal in the unwanted domain comprises measuring the transmission signal in an out-of-band domain.

8. A test system configured to test a transmission equipment to be tested in an over-the-air test, wherein the transmission equipment is configured to transmit a transmission signal, and the transmission signal as transmitted comprises emissions in an in-band domain and emissions in an unwanted domain, the test system comprising:
- a frequency selective surface configured to receive the transmission signal, wherein the frequency selective surface is configured to:
  - attenuate the transmission signal in the in-band domain of the transmission signal, and
  - allow propagation of the transmission signal in the unwanted domain of the transmission signal; and
- measuring equipment configured to measure a parameter of the transmission signal in the unwanted domain;
- wherein the frequency selective surface is disposed between the transmission equipment and the measuring equipment.

9. The test system of claim 8, wherein the frequency selective surface functions as a stop-band filter which attenuates the transmission signal substantially only in the in-band domain.

10. The test system of claim 8, wherein the frequency selective surface is a capacitive type of frequency selective surface.

11. The test system of claim 10, wherein the frequency selective surface comprises an array of conductive elements arranged on a dielectric.

12. The test system of claim 8, wherein the transmission equipment comprises an antenna system, an Active Antenna System, a multi-antenna, or a Multiple-Input-Multiple-Output (MIMO) antenna.

13. The test system of claim 8, wherein the measuring equipment is configured to measure a parameter of the transmission signal in a spurious domain.

14. The test system of claim 8, wherein the measuring equipment is configured to measure a parameter of the transmission signal in an out-of-band domain.

* * * * *